United States Patent
In'T Hout

(10) Patent No.: US 9,416,660 B2
(45) Date of Patent: Aug. 16, 2016

(54) PIN HANDLING DEVICE, COUPLING PIN AND METHOD FOR PIN HANDLING IN HIGH WALL MINING

(75) Inventor: Cornelis Wilhelm In'T Hout, Dordrecht (NL)

(73) Assignee: Caterpillar Global Minig Highwall Miners LLC, Beckley, WV (US)

( * ) Notice: Subject to any disclaimer, the term of this patent is extended or adjusted under 35 U.S.C. 154(b) by 87 days.

(21) Appl. No.: 14/130,208

(22) PCT Filed: Jul. 3, 2012

(86) PCT No.: PCT/US2012/045340
§ 371 (c)(1),
(2), (4) Date: Mar. 18, 2014

(87) PCT Pub. No.: WO2013/012555
PCT Pub. Date: Jan. 24, 2013

(65) Prior Publication Data
US 2014/0231228 A1  Aug. 21, 2014

(30) Foreign Application Priority Data
Jul. 15, 2011 (NL) ...................................... 2007118

(51) Int. Cl.
*B65G 19/28* (2006.01)
*B65G 41/00* (2006.01)
(Continued)

(52) U.S. Cl.
CPC ................ *E21F 13/00* (2013.01); *B65G 41/00* (2013.01); *E21F 13/08* (2013.01); *Y10T 29/49826* (2015.01); *Y10T 29/53* (2015.01); *Y10T 403/75* (2015.01)

(58) Field of Classification Search
CPC .......... E21F 13/08; E21F 13/00; B65G 41/00; B65G 19/28; Y10T 403/75; Y10T 29/53; Y10T 29/49826
USPC ................ 198/666–668, 735.2, 735.6, 860.1, 198/860.2
See application file for complete search history.

(56) References Cited

U.S. PATENT DOCUMENTS 3,822,011 A   7/1974  Braun et al.
4,142,812 A * 3/1979  Steinkuhl .................... 198/735.6
(Continued)

FOREIGN PATENT DOCUMENTS

DE          4216117 A1 * 11/1993

OTHER PUBLICATIONS

European Patent Office Search Report for Netherlands Application No. 2007118, dated Feb. 29, 2012, 3 pages.
(Continued)

*Primary Examiner* — Mark A Deuble

(57) ABSTRACT

A pin handling device for coupling and decoupling conveyor segments to and from a train of conveyor segments in high wall mining includes a base frame, a base frame drive system for moving the base frame relative to the conveyor segments, a connector element for holding pins to be handled, a rotational drive system attached to the base frame and connected to the connector element, and a lift system attached to the base frame and carrying the connector element for linear movement of the connector element. A coupling pin is also provided for coupling conveyor segments in a train of conveyor segments in high wall mining as well as the conveyor segment that enables the use of such pin handling device and such coupling pins. A method of coupling and detaching conveyor segments for high wall mining is also provided.

8 Claims, 5 Drawing Sheets

(51) Int. Cl.
*E21F 13/00* (2006.01)
*E21F 13/08* (2006.01)

(56) References Cited

U.S. PATENT DOCUMENTS

| | | | |
|---|---|---|---|
| 4,773,528 A * | 9/1988 | Anderson et al. | 198/861.2 |
| 5,033,604 A * | 7/1991 | Steinkuhl et al. | 198/735.6 |
| 5,609,397 A | 3/1997 | Marshall et al. | |
| 5,634,545 A * | 6/1997 | Plumley | 198/303 |
| 6,035,997 A * | 3/2000 | Heninger et al. | 198/735.2 |
| 6,651,804 B2 * | 11/2003 | Thomas et al. | 198/594 |
| 6,698,843 B2 | 3/2004 | Mraz | |
| 7,070,040 B2 * | 7/2006 | Klabisch | B65G 19/287 198/735.1 |
| 7,717,522 B2 | 5/2010 | In'T Hout et al. | |
| 7,721,869 B2 | 5/2010 | In 'T Hout | |
| 8,678,173 B2 * | 3/2014 | Lasley | 198/513 |
| 2007/0216216 A1 | 9/2007 | Baird | |
| 2008/0197690 A1 | 8/2008 | In'T Hout | |
| 2008/0277244 A1 | 11/2008 | Antoline | |
| 2009/0039695 A1 | 2/2009 | Antoline et al. | |
| 2009/0085395 A1 | 4/2009 | Webb | |

OTHER PUBLICATIONS

International Search Report for International Application No. PCT/US2012/045340, dated Dec. 6, 2012, 3 pages.

* cited by examiner

PIN HANDLING DEVICE, COUPLING PIN AND METHOD FOR PIN HANDLING IN HIGH WALL MINING

CROSS-REFERENCE TO RELATED APPLICATIONS

This application claims the benefit of priority to international patent application number PCT/US2012/045340, having a filing date of Jul. 3, 2012, which claims the benefit of priority to Netherlands patent application number 2007118, having a filing date of Jul. 15, 2011, the complete disclosures of which are hereby incorporated by reference for all purposes.

TECHNICAL FIELD

The invention relates to a pin handling device, for coupling and decoupling conveyor segments to and from a train of conveyor segments in high wall mining. The invention also relates to a coupling pin for coupling conveyor segments in a train of conveyor segments, as well as the conveyor segment that is suited to be used in combination with the pin handling device. And even more the invention also provides a method of coupling and detaching conveyor segments for highwall mining.

BACKGROUND

High wall mining is applied in the mining of coal, minerals, ores or other materials in seams or veins under an overburden which may be accessed from an exposed edge of the seam or vein. Highwall mining is applicable where the appropriate machinery can be placed in a cut or trench to extend a cutter head, followed by a train of conveyor segments or units as the cutter head advances, into a substantially horizontal or sloping shaft under the overburden. The conveyor segments are also known as push beams, as they are pushed into the mine, forming an elongating train of conveyor segments as the cutter head advances. Each conveyor segment normally has auger screw transporters to move coal from its lead end to its rear end and further onto the next rearward conveyor segment, and ultimately to the launch vehicle located outside the entrance of the mine shaft. The augers can be powered by shafts connected from one conveyor segment to the next, thus transmitting and distributing power of one or more motors along the conveyor segments of the train. For elongating and shortening the train of conveyor segments conveyor segment are added to or removed from the train of conveyor segments. To realize the coupling or decoupling normally use is made of a coupling mechanism, usually a hook or straight manual pin, that is attached to, or detached from, a coupling element of the next conveyor segment in the line, wherein the coupling element is usually a reinforced ring or bar that suits the dimensions of the hook or straight manual pin. The hook or straight manual pin is moveable between an open/unlocked, non-coupling position for receiving a coupling element, and a closed position for connection with a coupling element. In order to secure the coupling between the hook in the closed position and the coupling element, the closed position of the hook is secured by applying a wedge that blocks displacement of the hook to the open, non-coupling position or by a resilient block, made of synthetic or natural rubber-like polymer materials. Due to the enhanced demands towards the use of deeper and steeper mining as well as towards safer/easier/cheaper maintenance and servicing of the conveyor segments there is a demand for further secure autonomy improvements on highwall mining equipment.

SUMMARY

According to one embodiment, a safer and cheaper coupling method of conveyor segments in high wall mining as well as the means for exerting such improved method is provided.

The disclosure provides a pin handling device, for coupling and decoupling conveyor segments to and from a train of conveyor segments in high wall mining; the pin handling device comprising: a base frame; a base frame drive system for moving the base frame relative to the conveyor segments; a connector element, for holding pins to be handled; a rotational drive system attached to the base frame and connected to the connector element; and a lift system attached to the base frame and carrying the connector element for linear movement of the connector element. Such a pin handling device provides coupling that does not suffer the disadvantages associated with the coupling and decoupling of highwall conveyor segments according various prior art methods. Moreover an automated system lowers the demand for manual labour in coupling and decoupling at high risk locations. Besides the absence of risk for workers it will also increase the production speed in the high wall mining process. Thus the pin handling device enables the coupling and the decoupling of conveyor segments for highwall mining less time-consuming and less hazardous. Furthermore it makes it possible to work at a closer distance of the overburden, as launch platforms may be placed in a more inclined position as well as that they may be placed closer to the seam entry, thus permitting to use one or more conveyor segments less for mining at a specific depth. The linear movement of the connector element is to move the connector element, and thus also a pin that is hold by the connector element, towards and away from the conveyor segments. The pin handling device may be attached to a launch platform for high wall mining, or may be a separate unit. The base frame drive system, the rotational drive system and/or the lift system may be provided with electric of hydraulic drive means.

In a specific embodiment the pin handling device also comprises a coupling mechanism for coupling the pin handling device to at least one conveyor segments. The advantage of coupling the pin handling device to at least one conveyor segments is that thus the pin handling device is carried along with the movement (inward or outward the shaft under the overburden wherein the highwall mining is performed) of the train of conveyor segments. The pin handling device is thus oriented in a fixed position towards the conveyor segments to be coupled or uncoupled independent on the movement of the train. Such relative fixed position of the pin handling device and at least one conveyor segment makes it simple and reliable to execute the placing or removal of a coupling pin. The positioning may be provided by a positioning pin that cooperates with a pin-hole that matches the positioning pin. A further advantage is that the coupling the pin handling device to at least one conveyor segments also enable an accurate positioning of the pin handling device relative to a conveyor segment, and thus also contributes towards accurate process control.

In a further embodiment the rotational drive system may be provided with a motor and a transmission for rotating the connector element. For example the transmission may be a belt, chain or gear drive. Such drive systems are easy to assemble and to service as they may be constructed from shelf parts.

In a specific further embodiment the rotational drive system is rotatable in two directions. Also the part of the connector element that contacts the coupling pins may be tapered, polygonal or splined and provided with a counter treaded bushing. Such a connector element with a taper treaded counter bore box is so designed to shoulder fit a coupling pin with a tapered, polygonal or splined tread and is designed to provide a high strength coupling that is capable of carrying heavy loads and that may be used under heavy wear conditions. Such a connector element and pin combination is also know as a "Collar-Kelly" or "Kelly-drive" and may provide a pen with a polygonal or splined outer pin surface, which passes through the matching polygonal, splined or tapered Kelly mating bushing, preferable with torque rollers, from the connector element that is rotatable driven in two directions; e.g. for coupling and unlocking Obviously, the shaping of the contact parts of the connector element and the pin may be interchanged.

In yet a further embodiment the base frame is connected to dual rotational drive systems both carrying a connector element and provided with a lift system. With such a double pin handling device two coupling pins may be placed or removed at the same time; thus enabling a more stable coupling of the conveyor segments in the same period of time.

The disclosure also provides a coupling pin for coupling conveyor segments in a train of conveyor segments in high wall mining; the coupling pin with a tapered, polygonal or splined treaded head. Such a coupling pin is simply to be used with an automatic pin handling device according the present invention. The opposite side of the head of the coupling pin may be bar shaped and the coupling pin may also be provided with positioning means for positioning the pin with respect to a connector element for handling the coupling pin. Such a coupling pin is with only minimal number of rotations of a connector element to be gripped and, as already explained above in relation to the pin handling device according the present invention, the coupling pin is to provide a high strength coupling that is capable of carrying heavy loads and that may be used under heavy wear conditions. The coupling also referred to as Kelly coupling, is easy to realize and, also under heavy wear and freezing weather conditions, easy to unlock. The bar shaped end of the coupling pin is to be placed in a coupling opening between subsequent conveyor segments. This type of coupling facilitates also easy positioning of the pin with respect to the connector element of the pin handling device. Thus, a coupling pin and the connector element are more easily horizontal, vertical and/or inclined oriented with respect to each other in order to enable a more facile coupling.

A further part of the present invention is the conveyor segment for use in a train of such conveyor segments in high wall mining that is provided with: at least one first opening at a first end of the conveyor segment, and at least one second opening located at a second end of the conveyor segment, opposite to the first end, wherein first and second opening are suited for receiving a coupling plug, and the first and second opening both connect to a pin opening that is perpendicular to the first and second opening, which pin openings lead towards a flat side of the conveyor segment, wherein a coupling plug is to be linked to the conveyor segment by placing a coupling pin from the flat side of the conveyor segment though the pin opening such that it cooperates with the coupling plug. In a specific embodiment the conveyor segment comprises two first openings at a first end of the conveyor segment and two second openings located at a second end of the conveyor segment, opposite to the first end. Such conveyor segments are to be used with the pin handling device and the coupling pins as part of the present invention. For the advantages of the conveyor segment reference is made to the advantages presented already before. Furthermore more than one opening for receiving coupling plugs is advantageous, as such leads to an increased stability of the coupling between two adjacent conveyor segments. Naturally, the positions of the first and second openings are chosen to enable a coupling between adjacent conveyor segments in a head-to-tail fashion (e.g. the first end of a first conveyor segment may be coupled to the second end of a second conveyor segment). Also the assembly of at least two of these conveyor segments is part of the invention wherein at least one coupling plug is connected adjacent conveyor segments, on both sides of the coupling plug with coupling pins that are placed in the pin openings.

The disclosure also provides a method of coupling conveyor segments for highwall mining using a pin handling device as disclosed above, wherein the method comprises the processing steps of: A) bringing a first conveyor segment with a secured coupling plug is in contact with a second conveyor segment such that the coupling plug which is already connected to one of the conveyor segments is placed in the opening for receiving the coupling plug, B) linking the pin handling device with the assembly of the first and second conveyor segments such that is moves along with the movement of the assembly, C) moving the connector element of the pin handling device that holds a connecting pin with the lift mechanism towards the assembly of first and second conveyor segments such that the connecting pin is place in the pin opening of one of the conveyor segments and connects to the coupling plug, and D) rotating the connector element such that the coupling pin is detached from the connector element. The coupling pin may be locked in its rotational position by a securing element that is connected to the conveyor segment, and may contact a flat side provided for this purpose on the head or shoulder of the connecting pin. Furthermore the present disclosure also provides a method for releasing conveyor segments for highwall mining using the already described pin handling device, wherein the method comprises the processing steps of: E) linking the pin handling device with the assembly of the connected first and second conveyor segments such that is moves along with the movement of the assembly, F) moving an empty connector element of the pin handling device pin with the lift mechanism towards the assembly of connected first and second conveyor segments such that the connector element contacts the coupling pin, G) rotating the connector element such that the connector elements connects to a coupling pin that is to be detached from the connected first and second conveyor segments, and H) lifting the connector element such that the connection pin is pulled out of the coupling plug and the pin opening of one of the conveyor segments. Thus, conveyor segments are relatively easily and rapidly coupled and secured as well as easily decoupled. The time saved compared to coupling and releasing of known conveyor segments improves the efficiency of the high wall mining process. The coupling may now be performed automatically. Thus, conveyor segments may be safely removed from a train of conveyor segments in a remote controlled manner without the need of physically heavy manpower at a hazardous location.

BRIEF DESCRIPTION OF THE DRAWINGS

The present disclosure will be further elucidated with reference to the non-limitative embodiments shown in the following figures, in which.

DETAILED DESCRIPTION

Figure 1:
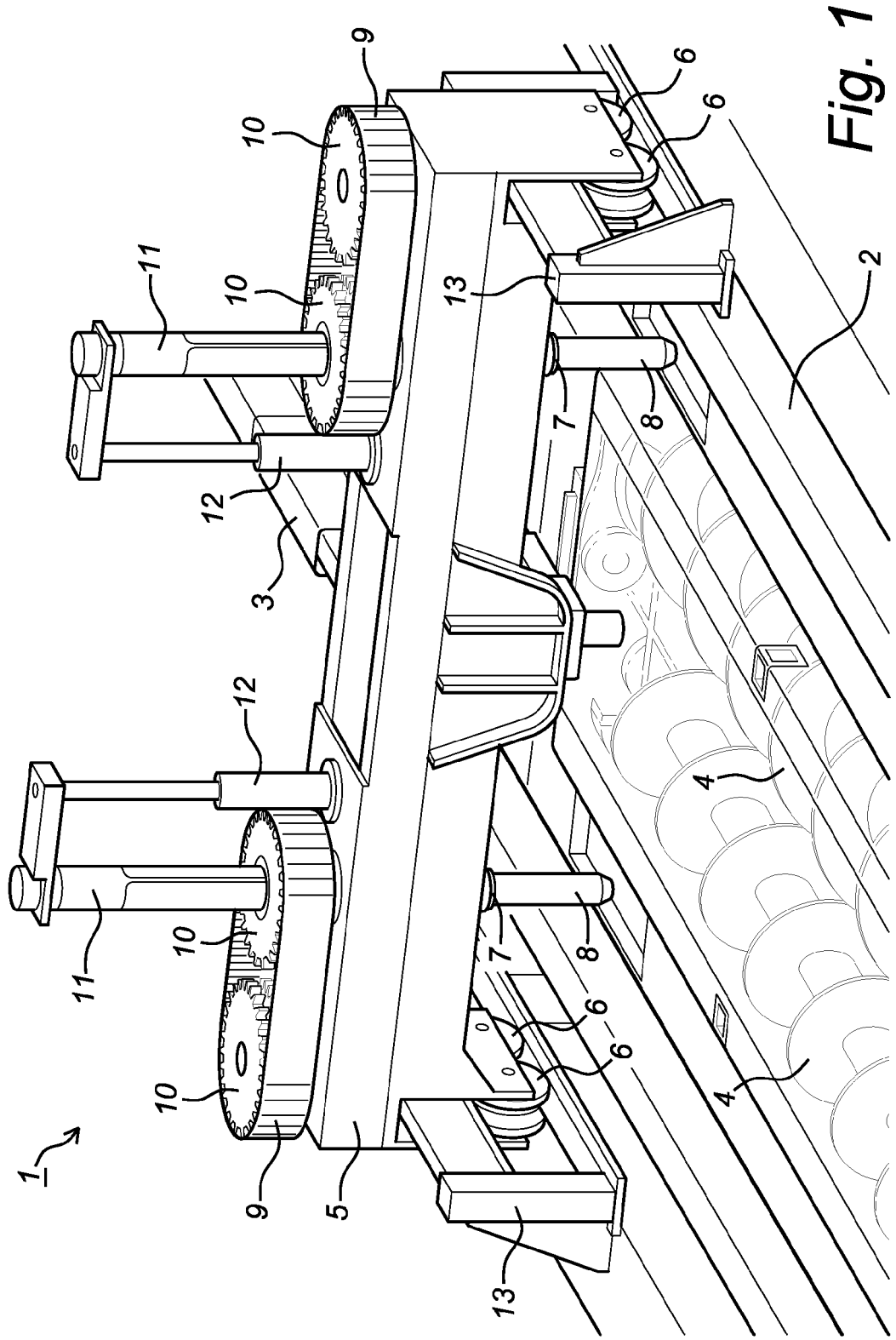
FIG. 1 shows a perspective view of a pin handling device according the present invention that cooperates with two—only partially depicted—conveyor segments for highwall mining.

FIG. 1 shows a pin handling device 1 according to the invention, for coupling and decoupling conveyor segments 2, 3. The conveyor segment 2 is depicted in a partly cut away view such that the auger beam transporters 4 are visible, which are to transport the mined material. The pin handling device 1 comprises a base frame 5 which is movable via wheels 6 (drive system) relative to the conveyor segments 2, 3. The pin handling device 1 also comprises two connector elements 7 (only partially visible here) for coupling pins 8 to be handled. Via belts 9 and pulleys 10 two in this figure non visible motors (that may be incorporated in the base frame 5) vertical shafts 11 are rotated. These vertical shafts 11 on their lower end carry the connector elements 7, thus rotating the shafts 11 results in rotating the connector elements 7. The vertical shafts 11 are both connected to a lift cylinder 12 to lower or lift the connector elements 7 and thus to lower the coupling pins 8. Furthermore this figure also shows dual guides 13 for guiding the base frame 5 and the wheels 6 relative to the conveyor segments 2, 3 as both the guides 13 and the conveyor segments 2, 3 are oriented by a guide frame 14 (launching platform) that is part of the mining equipment that moves along the train of conveyor segments 2, 3. As for the movement of the pin handling device 1 along with the conveyor segments 2, 3 a coupling mechanism from which only a moveable coupling mechanism pen 15 is visible. By moving the coupling mechanism pen 15 at a suited moment the coupling mechanism pen 15 connects to the conveyor segment 2 thus making that the pin handling device 1 is drawn along with the movement of the conveyor segment 2. After a certain period and before the wheels 6 reach the end of the guides 13 the coupling mechanism pen 15 has to be detached from the conveyor segment 2 and the pin handling device 1 may be wheeled back to the point of departure, by a non shown active drive system (e.g. a linear motor or a cylinder/plunger) or alternatively by gravitational or spring loaded force.

Figure 2:
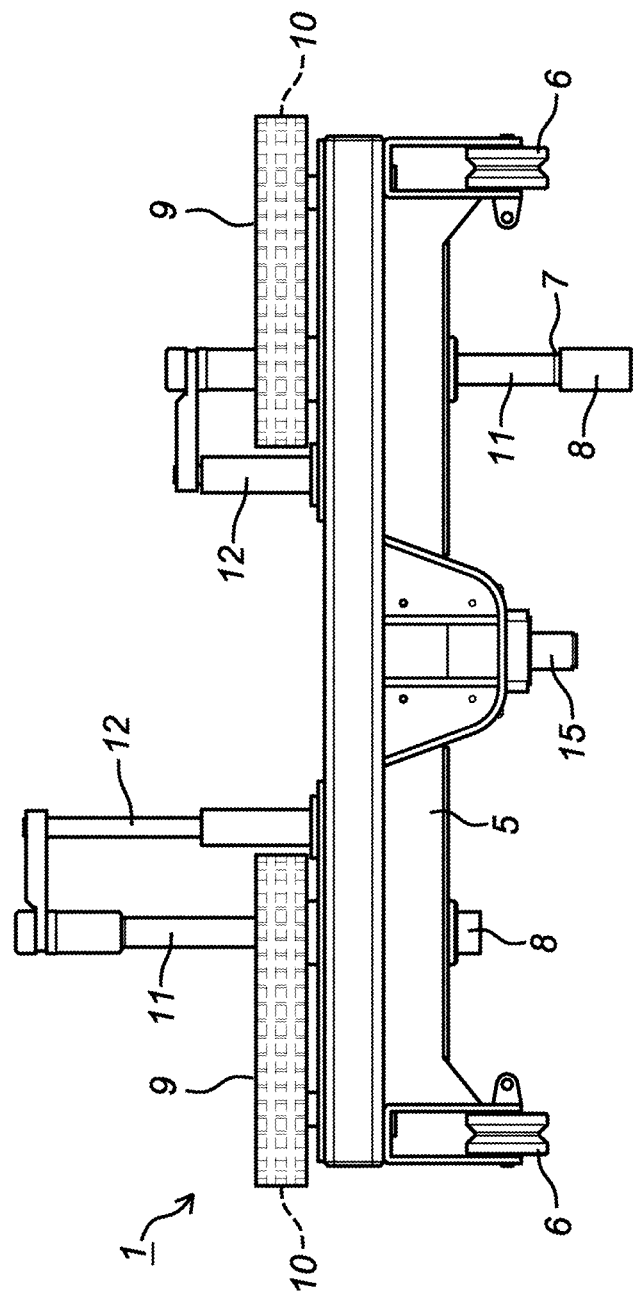
FIG. 2 shows a frontal view on the pin handling device shown in FIG. 1.

FIG. 2 shows the pin handling device 1 in a frontal view and the same reference numbers are used for all the identical elements as referred to in FIG. 1. The two vertical shafts 11 are depicted in different orientations; one with the lift cylinder 12 in a lower position and one with the lift cylinder 12 in an upper position.

Figure 3:
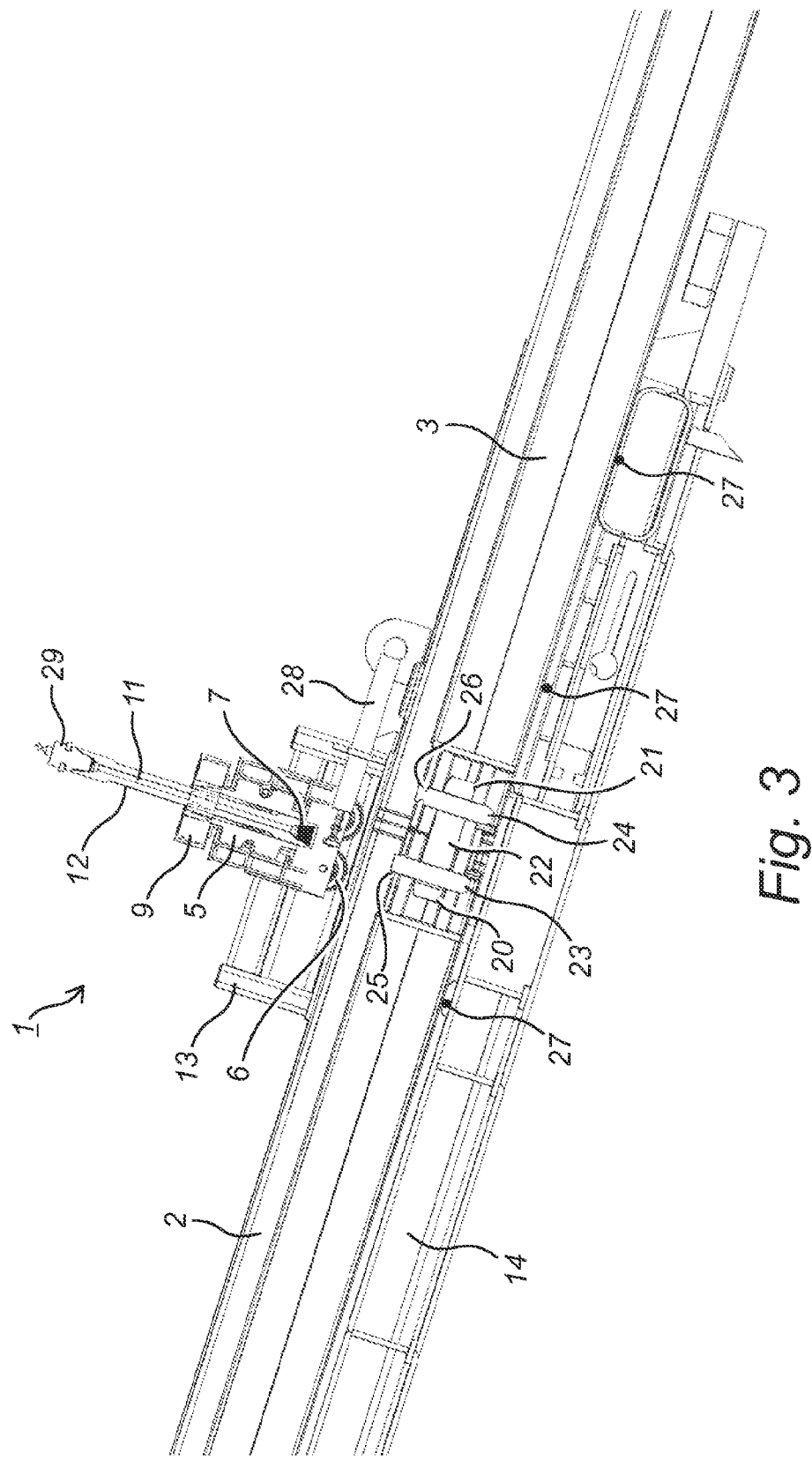
FIG. 3 shows a length sectional view of the pin handling device according to an embodiment of the invention.

FIG. 3 shows length sectional view of the pin handling device 1 with the adjacent conveyor segments 2, 3 in a coupled position. Conveyor segment 2 is provided with a first opening 20 and conveyor segment 3 is provided with a second opening 21, which openings are aligned and in which openings 20, 21 a coupling plug 22 is placed. From both sides of the coupling plug 22 coupling pins 23, 24 stick through pin openings 25, 26 in the conveyor segments 2, 3 as well as that the coupling pins 23, 24 stick into the coupling plug 22 thus providing a solid coupling between the conveyor segments 2, 3. This figure also provide a more clear view on the connector element 7 that is cone shaped and provided with a cone shaped tapered bore that enables the coupling of the connector element 7 and a coupling pin 23, 24 by rotating the connector element 7 after being brought in contact with a cone shaped tapered head 25 of the coupling pin 23. The coupling pin 24 is provided with a different shaped head 26 that is not suited to be coupled with the connector element 7. However for coupling the conveyor segments 2, 3 on the launching platform 14 (the launch level is referred to with reference sign 27).

Dependent on the fitting of the first and second openings 20, 21, the coupling plug 22 and the coupling pin 23, 24 a slightly inclination (angle α) between adjacent conveyor segments may be allowed. Such inclination may be a slightly downward inclination or a slightly upwards inclination. In a specific embodiment a maximal angle α between adjacent conveyor segments of approximately 3° is allowed. Such a maximum inclination provides the flexibility in a train of conveyor segments to allow the cutter head of the train to pursue the preferred route when cutting a mine shaft. However, the amount of freedom per conveyor segment remains small enough to provide for the desired reliability and control over the movement of the conveyor segments. Thus a certain known inclined deviation per conveyor segment "interface to interface" length resulting in an ideal "vertical radius of curvature" to allow "steep dip" directional mining.

The FIG. 3 also shows cylinder 28 that creates an active drive for moving the pin handling device 1 relative to the conveyor segments 2, 3. Furthermore a lubrication nipple 29 is shown on top of the vertical shaft 11, this lubrication nipple 29 enable to lubricate the connector element 7 (the coupling referred to as "Collar-Kelly" or "Kelly-drive").

Figure 4:
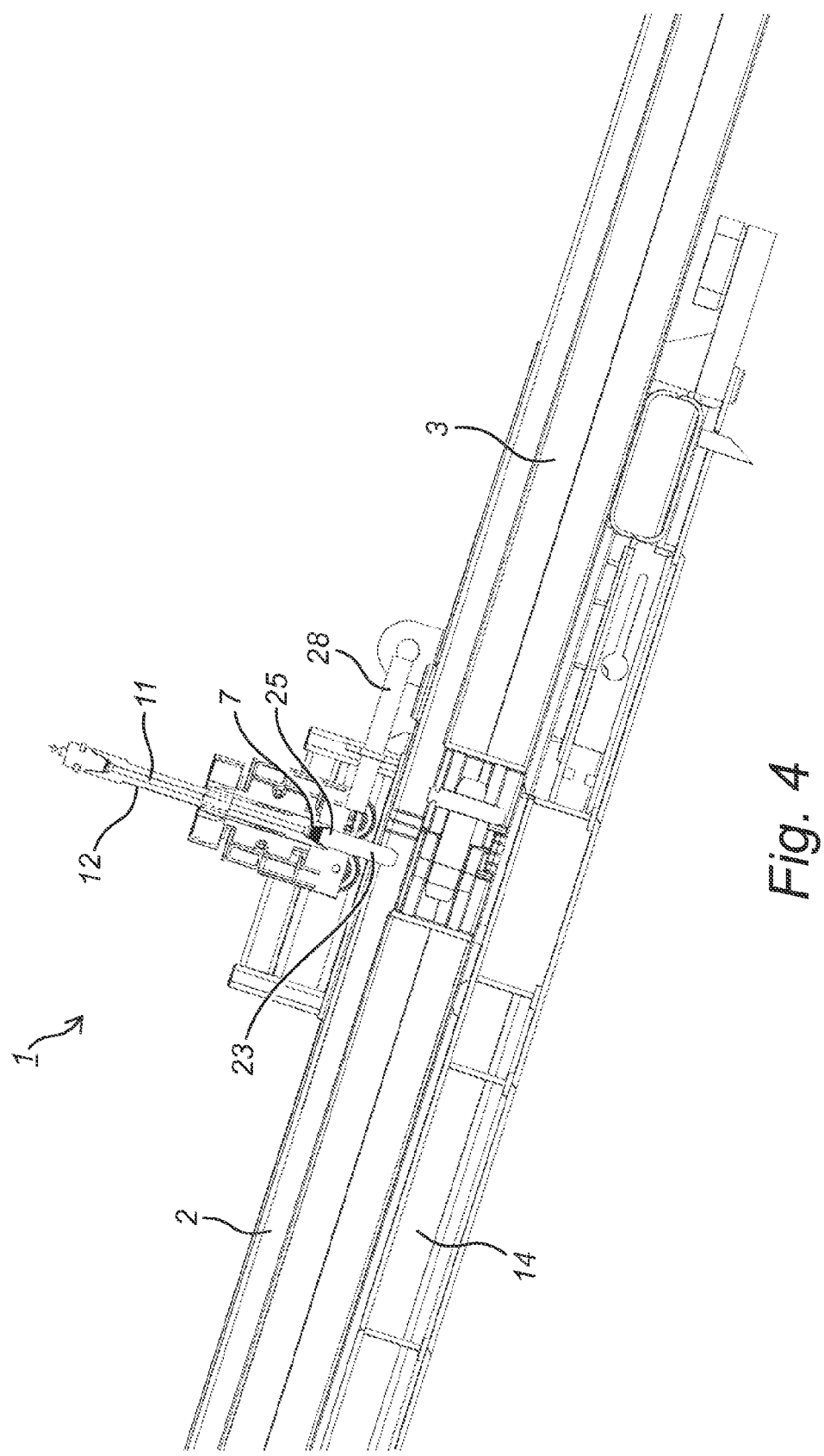
FIG. 4 shows a cross sectional view of the pin handling device as shown in FIG. 5 in a different position of the pin handling device.

In FIG. 4 shows again the length sectional view of the pin handling device 1 with the adjacent conveyor segments 2, 3 as depicted in FIG. 3 is shown however now in a active position of the in pin handling device 1 and the conveyor segments 2, 3 in an uncoupled position. The connector element 7 now holds the cone shaped tapered head 25 of the coupling pin 23 and the lift cylinder 12 moved the vertical shaft 11 upwards so that the coupling pin 23 is now detached from the coupling plug 22 and the conveyor segment 2. The conveyor segments 2 and 3 are thus not coupled by the coupling plug 22. Note is made that in this description the impression is given that the conveyor segments 2, 3 where originally coupled and are now detached by moving the coupling pin 23 aside, however it is also possible that the conveyor segments 2, 3 where originally not coupled but the pin handling device 1 is now in a position to start the coupling of the conveyor segments 2, 3 by bringing in the coupling pin 23.

Figure 5:
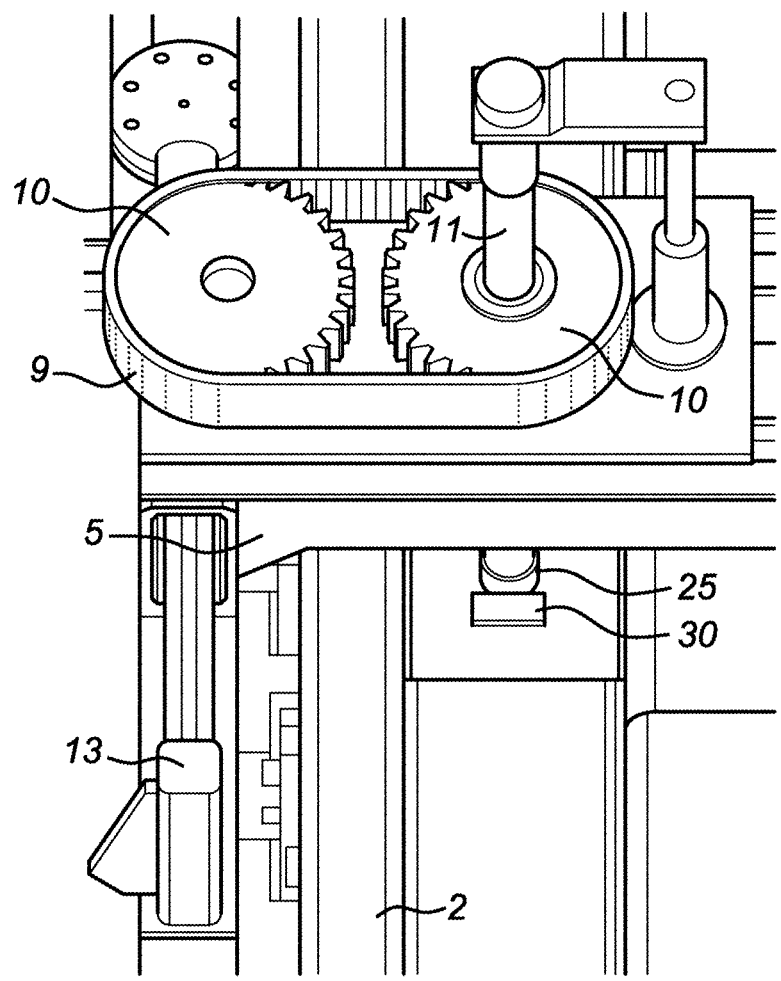

FIG. 5 shows a detail of the pin handling device 1 and conveyor segment 2. On the conveyor segment 2 a securing element 30 is provided that is also referred to as a "connection make-up and break-out torque hold key". The securing element 30 is to contact a flat side on the head 25 of the coupling pin 23 to prevent rotational slip during the connecting and disconnecting of the connector element 7 and the coupling pin 23.

Obviously, the scope of the disclosure is wider than the examples shown here, and includes various other embodiments and variations.

The invention claimed is:

1. A pin handling device, for coupling and decoupling conveyor segments to and from a train of conveyor segments in high wall mining; the pin handling device comprising:
   a base frame;
   a base frame drive system for moving the base frame relative to the conveyor segments;

a connector element, for holding pins to be handled;
a rotational drive system attached to the base frame and connected to the connector element; and
a lift system attached to the base frame and carrying the connector element for linear movement of the connector element.

2. The pin handling device as claimed in claim 1, wherein the pin handling device also comprises a coupling mechanism for coupling the pin handling device to at least one conveyor segment.

3. The pin handling device as claimed in claim 1, wherein the rotational drive system is provided with a motor and a transmission for rotating the connector element.

4. The pin handling device as claimed in claim 1, wherein the rotational drive system is rotatable in two directions.

5. The pin handling device as claimed in claim 1, wherein a part of the connector element that contacts the coupling pins is a tapered, polygonal or splined and counter treaded bushing.

6. The pin handling device as claimed in claim 1, wherein the base frame is connected to dual rotational drive systems both carrying a connector element and provided with a lift system.

7. A method of coupling conveyor segments for high wall mining using a pin handling device, wherein the method comprises the steps of:
   A) bringing a first conveyor segment with a secured coupling plug in contact with a second conveyor segment such that the coupling plug which is already connected to one of the conveyor segments is placed in an opening for receiving the coupling plug,
   B) linking the pin handling device with an assembly of the first and second conveyor segments such that it moves along with a movement of the assembly,
   C) moving a connector element of the pin handling device that holds a connecting pin with a lift mechanism towards the assembly of first and second conveyor segments such that the connecting pin is placed in a pin opening of one of the conveyor segments and connects to the coupling plug, and
   D) rotating the connector element such that the coupling pin is detached from the connector element.

8. A method of releasing conveyor segments for high wall mining using a pin handling device, wherein the method comprises the steps of:
   A) linking the pin handling device with an assembly of connected first and second conveyor segments such that the pin handling device moves along with a movement of the assembly,
   B) moving a connector element of the pin handling device pin with a lift mechanism towards the assembly of connected first and second conveyor segments such that the connector element contacts the coupling pin,
   C) rotating the connector element such that the connector elements connects to a coupling pin that is to be detached from the connected first and second conveyor segments, and
   D) lifting the connector element such that the connection pin is pulled out of a coupling plug and a pin opening of one of the conveyor segments.

* * * * *